US006742476B2

(12) United States Patent
Sage, Jr.

(10) Patent No.: US 6,742,476 B2
(45) Date of Patent: *Jun. 1, 2004

(54) LITTER BOX

(76) Inventor: James R. Sage, Jr., 209 Linden St., Moorestown, NJ (US) 08057

( * ) Notice: Subject to any disclaimer, the term of this patent is extended or adjusted under 35 U.S.C. 154(b) by 0 days.

This patent is subject to a terminal disclaimer.

(21) Appl. No.: 10/431,677

(22) Filed: May 8, 2003

(65) Prior Publication Data

US 2003/0188691 A1 Oct. 9, 2003

Related U.S. Application Data

(63) Continuation of application No. 08/539,543, filed on Oct. 5, 1995, now Pat. No. 6,561,130.

(51) Int. Cl.⁷ .............................................. A01K 29/00
(52) U.S. Cl. ...................................... 119/166; 119/479
(58) Field of Search ................................ 119/166, 479, 119/161, 165, 167, 171, 482, 496, 497; D30/161

(56) References Cited

U.S. PATENT DOCUMENTS

| | | | | |
|---|---|---|---|---|
| 2,963,003 A | * | 12/1960 | Oberg et al. | 119/166 |
| 2,971,493 A | * | 2/1961 | Robb | 119/166 |
| D230,285 S | * | 2/1974 | Dilley | D30/161 |
| 3,793,989 A | * | 2/1974 | Clark | 119/165 |
| 4,325,325 A | * | 4/1982 | Larter | 119/166 |
| 5,168,834 A | * | 12/1992 | Buschur | 119/166 |
| 5,462,015 A | * | 10/1995 | Murphy | 119/496 |
| 5,507,252 A | * | 4/1996 | Ebert | 119/166 |
| 5,515,812 A | * | 5/1996 | Faust | 119/166 |
| 5,577,462 A | * | 11/1996 | Korth | 119/166 |
| D376,875 S | * | 12/1996 | Glickstein | D30/118 |
| 5,785,000 A | * | 7/1998 | Barbary | 119/166 |
| 6,561,130 B1 | * | 5/2003 | Sage, Jr. | 119/166 |

FOREIGN PATENT DOCUMENTS

DK 3028579 A1 * 2/1982

* cited by examiner

Primary Examiner—Charles T. Jordan
Assistant Examiner—Judith A. Nelson
(74) Attorney, Agent, or Firm—Ansel M. Schwartz

(57) ABSTRACT

A litter box having a first litter box half with a first recess. The first litter box half triangularly shaped. The litter box having a second litter box half with a second recess. The second litter box half engages with the first litter box half to form an enclosure. The first recess aligning with the second recess when the first litter box half and second litter box half are engaged to form an entrance to the enclosure through which an animal can enter the enclosure. The second litter box half triangularly shaped, and with the first litter box half to fit into corners. The litter box having a screen which fits into either the first litter box half or the second litter box half. The screen having handles so the screen can be lifted from either the first litter box half or the second litter box half.

6 Claims, 6 Drawing Sheets

LITTER BOX

This is a Continuation of application Ser. No. 08/539,543, filed Oct. 5, 1995, now U.S. Pat. No. 6,561,130.

FIELD OF THE INVENTION

The present invention is related to litter-boxes. More specifically, the present invention is related to litter boxes for cats which eliminates the need of the cat owner from contacting the litter.

BACKGROUND OF THE INVENTION

Throughout the world, the popularity of household pets is as strong as ever. In fact, it is not uncommon for a pet lovers dwelling to be home for multiple pets. One popular species is the domestic cat. Statistics show the domestic cat has surpassed the dog as the "pet of choice" in the 90's. Although cats are relatively low maintenance as compared to other types of household pets, the problem of how to best maintain the cat excrement faces every cat owner. An unpleasant task at best. In fact most kitty litter products display a warning suggesting that "pregnant women and immune-deficient patients avoid any litter box maintenance.

Over the years, many different products have been introduced to improve this task, but clearly the advent of clumping litter in the mid 1980's is one of the most important. Clumping litter solidifies wet excrement and deodorizes solid waste matter better than any other litter product available. This formula of cat litter has quickly become the #1 selling type of cat litter on the market.

Although "clumping Litter" is an improvement over other options, the disposal and maintenance problem still exists. Several of the more popular clumping kitty litter brands refer to themselves as "Scoopable", suggesting the use of some kind of scoop to remove the clumped waste from the litter. This method sends the cat owner on unpleasant search missions through the litter.

The present invention works with the strengths of clumping litter, by removing the clumps in one easy motion, reducing the time of the task and keeping the cat owner at a more comfortable distance.

SUMMARY OF THE INVENTION

The present invention pertains to a litter box. The litter box comprises a first litter box half with a first recess. The litter box also comprises a second litter box half with a second recess. The second litter box half engages with the first litter box half to form an enclosure. The first recess aligns with the second recess when the first litter box half and second litter box half are engaged to form an entrance to the enclosure through which an animal can enter the enclosure. Additionally, the litter box comprises a screen which fits into either the first litter box half or the second litter box half. The screen has handles so the screen can be lifted from either the first litter box half or the second litter box half.

The present invention pertains to a method for dealing with cat litter. The method comprises the steps of placing a screen into a first litter box half. Then, there is the step of placing cat litter onto the screen. Next, there is the step of engaging the first litter box half with a second litter box half so the first and second litter box halves form an enclosure. Then, there is the step of having an animal enter the enclosure through an entrance defined by a first recess in the first litter box half and a second recess in the second litter box half which align and form the entrance when the first and second litter box halves are engaged. Next, there is the step of removing the second litter box half from the first litter box half after the animal has left the enclosure. Then, there is the step of lifting the screen out of the first litter box half. Next, there is the step of sifting the cat litter through the screen into the first litter box half. Then, there is the step of cleaning the screen. Next, there is the step of placing the screen into the second litter box half. Next, there is the step of pouring the cat litter onto the screen in the second litter box half. Then, there is the step of engaging the first litter box half with the second litter box half.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
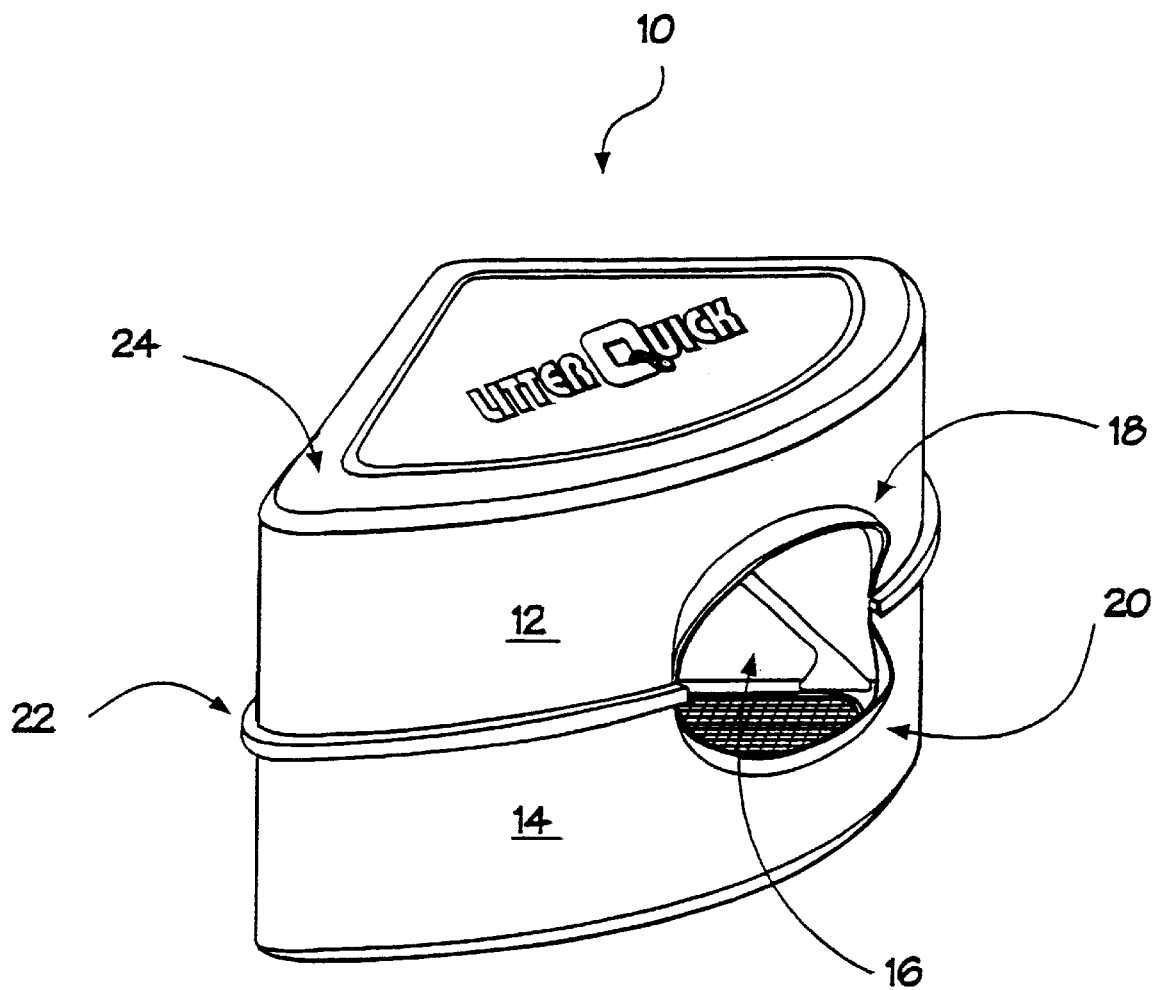
FIG. 1 is a ¾ view of a litter box.
Figure 1A:
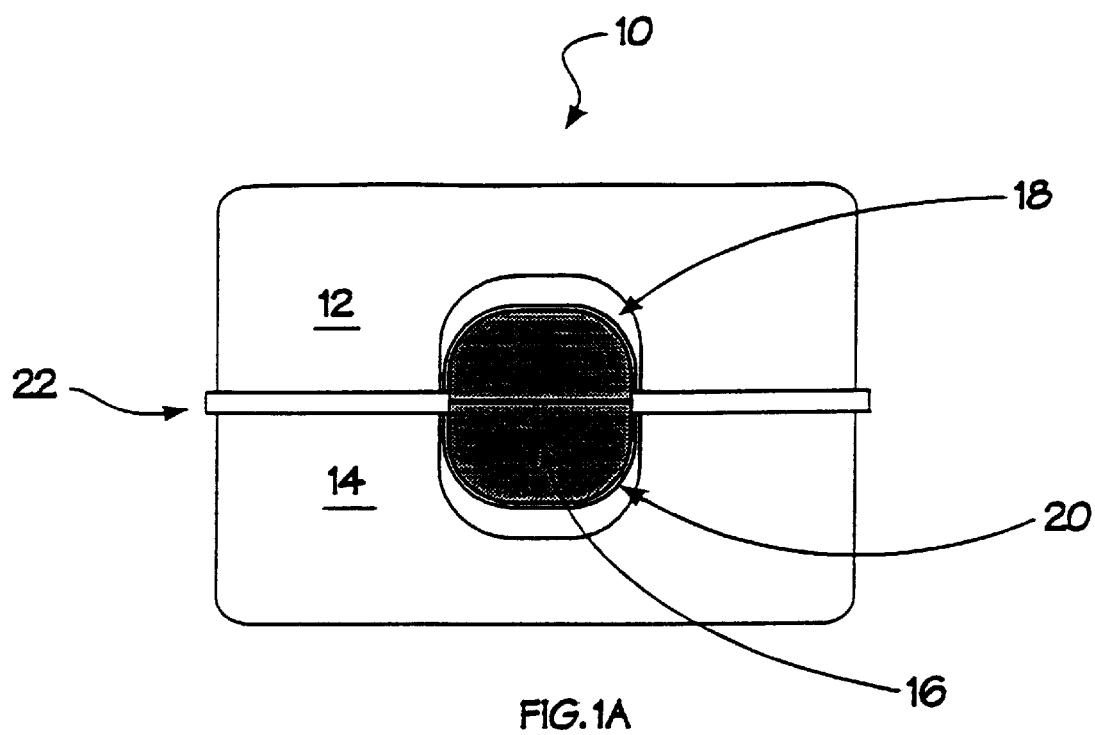
FIG. 1A is a front view of a litter box.
Figure 1B:
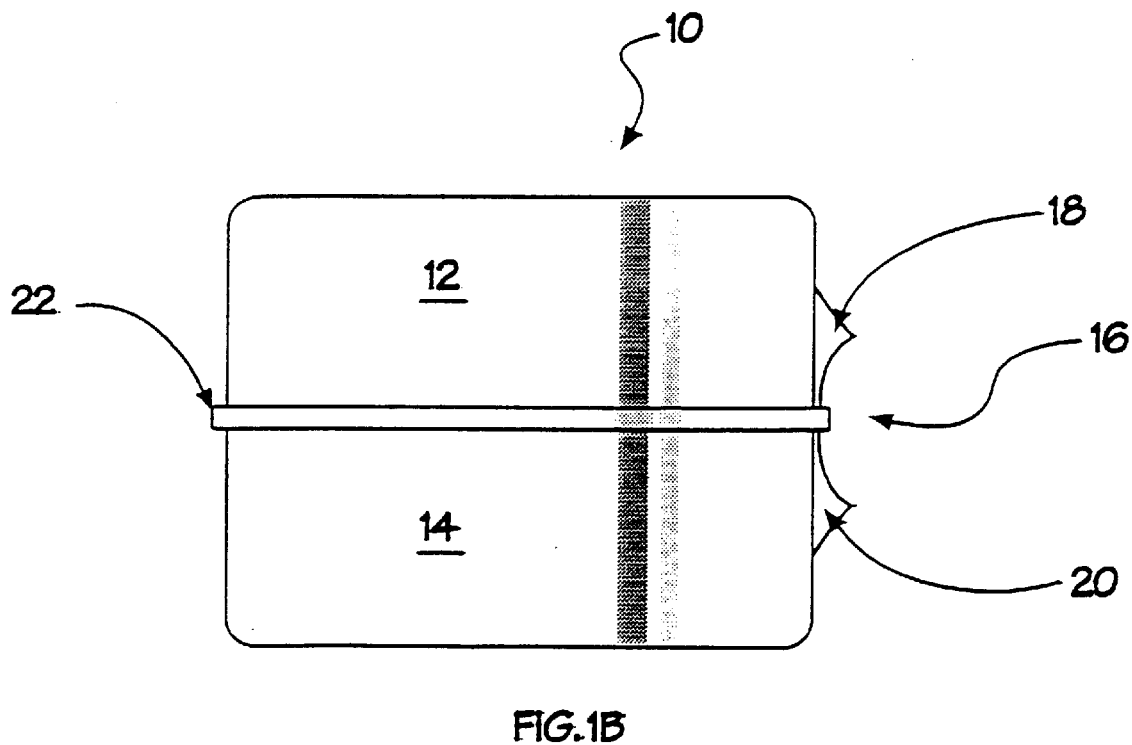
FIG. 1B is a side view of a litter box.
Figure 2:
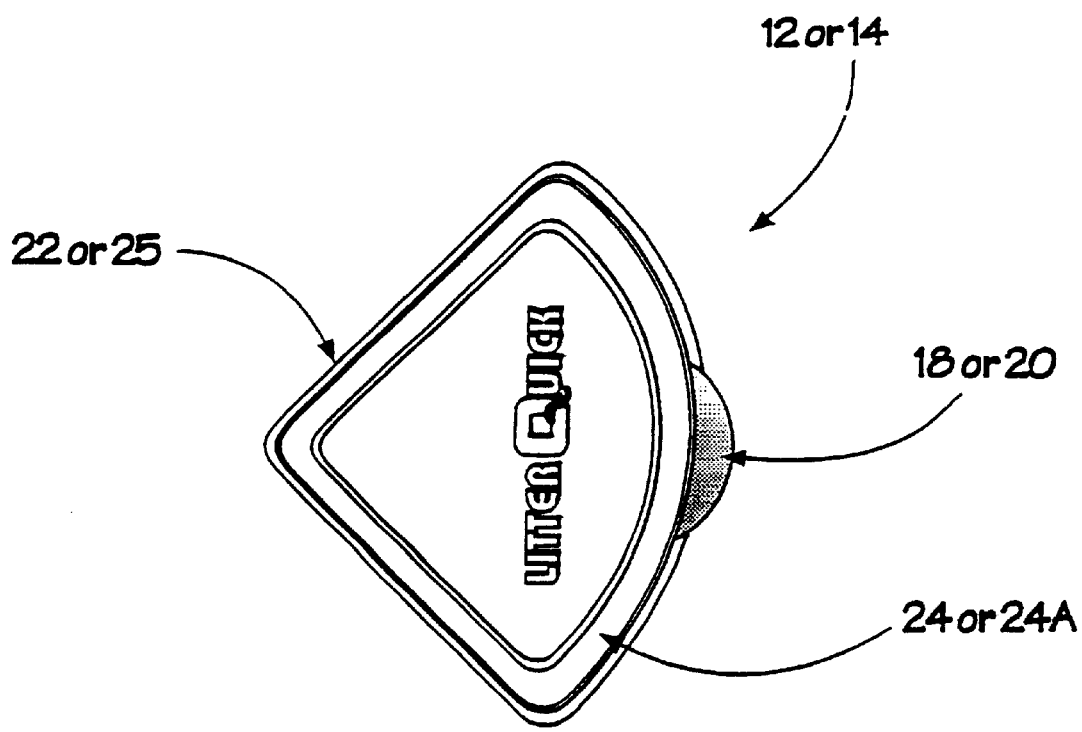
FIG. 2 is an overhead view of a litter box.
Figure 2A:
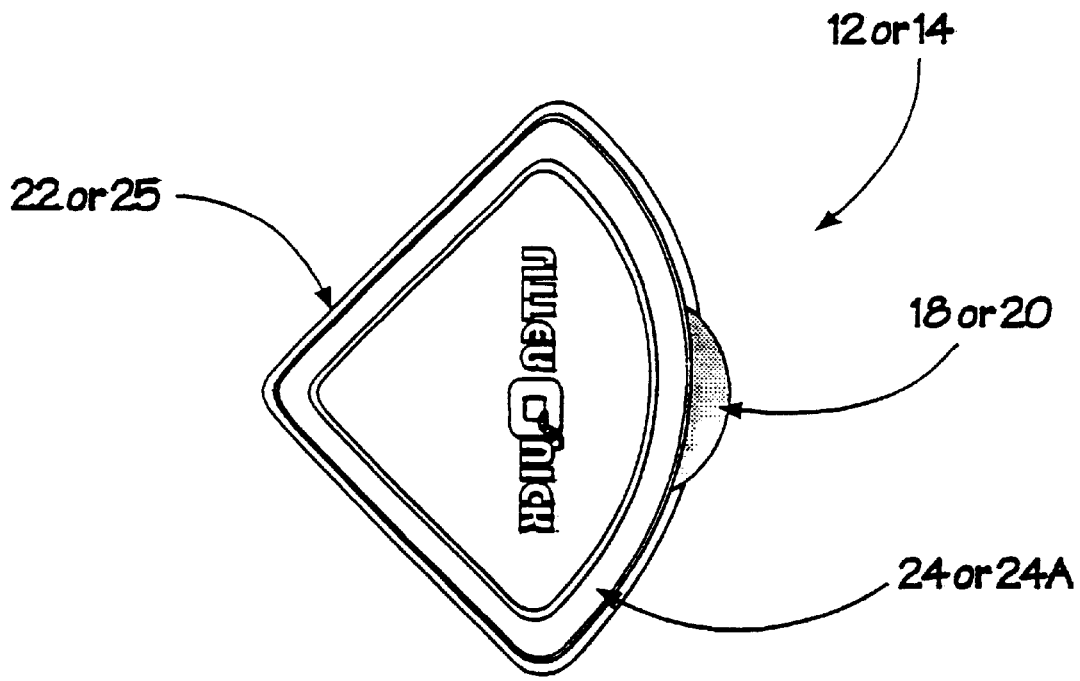
FIG. 2A is an overhead view of a litter box interior.
Figure 3:
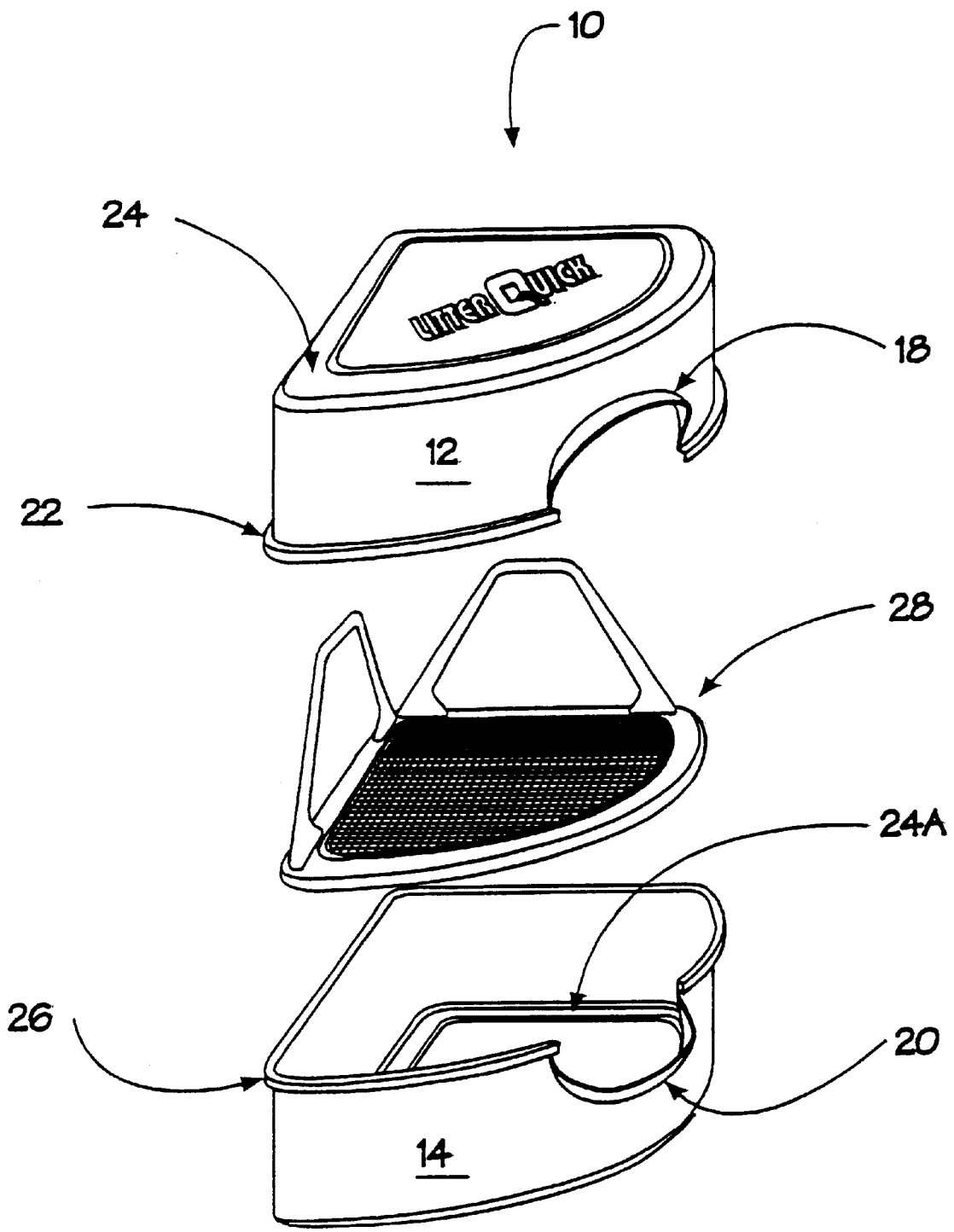
FIG. 3 is an exploded view of a litter box with screen.
Figure 4:
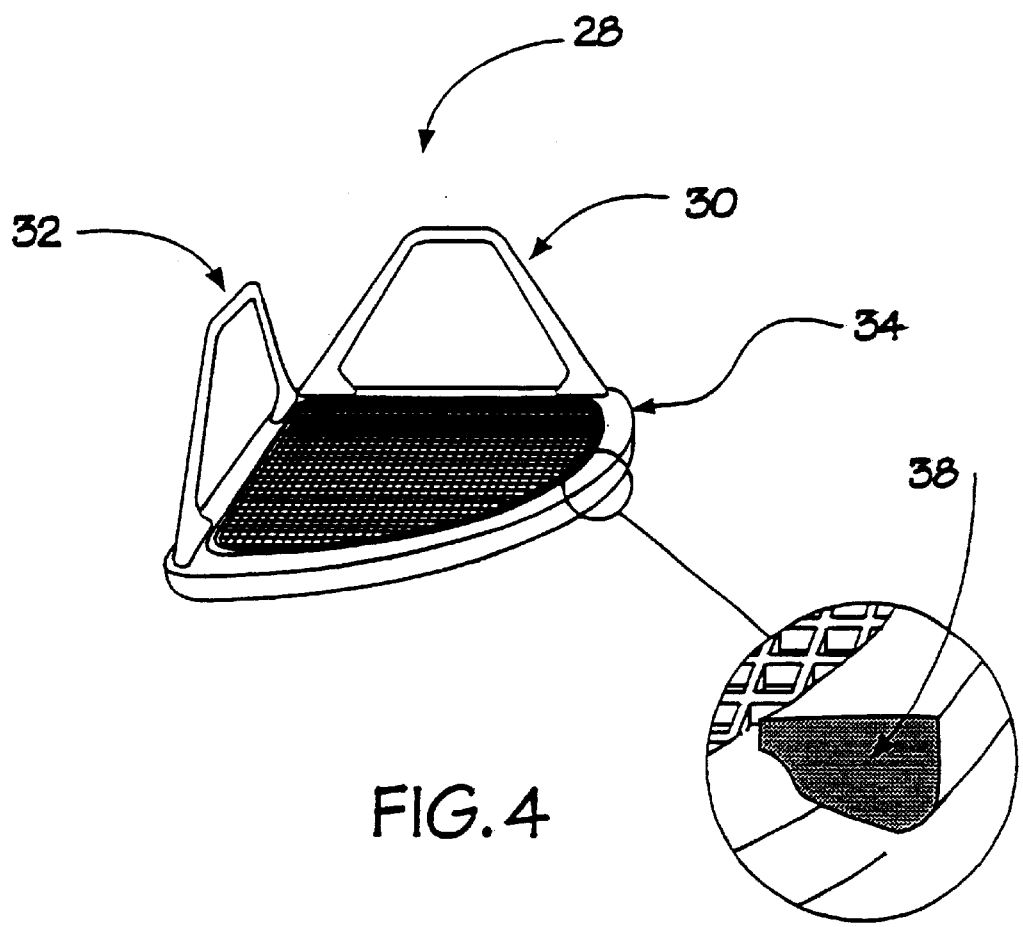
FIG. 4 is a ¾ view of a screen with an enlarged cutaway view of the screen rim.
Figure 4A:
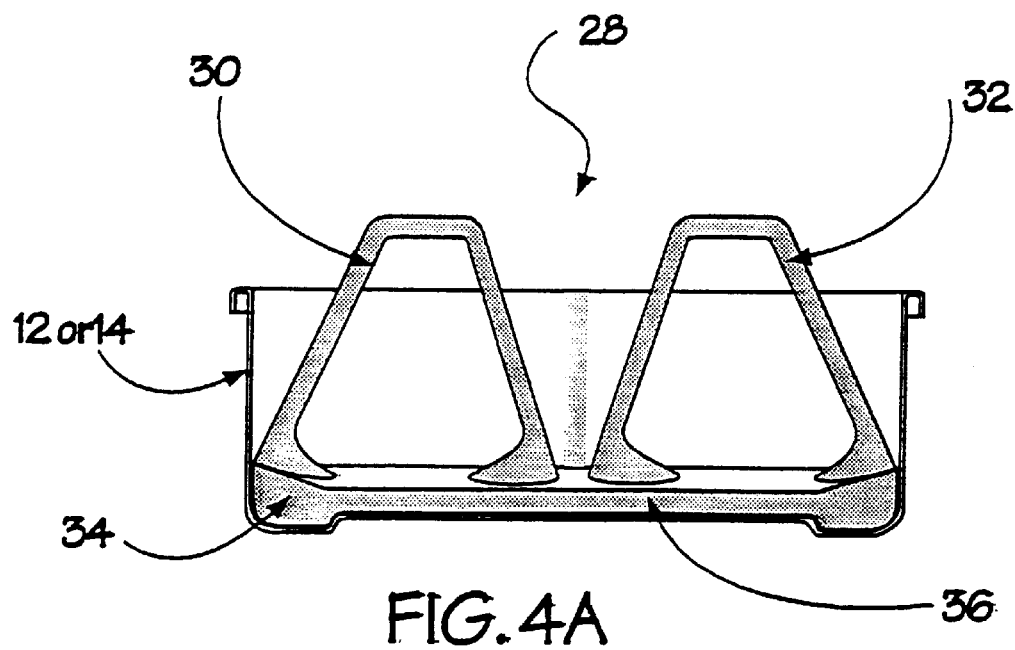
FIG. 4A is a cross section cutaway of a litter box half with screen front view.

Referring now to the drawings wherein like reference numerals refer to similar or identical parts throughout the several views, and more specifically to FIG. 3 thereof, there is shown a litter box 10. The litter box 10 comprises of at least two molded plastic triangular shaped litter box halves 12, 14. A screen 28 used for sifting and separating cat excrement from clean clumping style cat litter (not shown). The litter box 10 also comprises of a rim flange 22 and a rim seat 26 a means of securing the two litter box halves 12, 14 together, thus creating an enclosure that has an opening 16 which is used as a pet entrance and exit to and from the enclosure. The opening 16 has at least two pour spouts 18, 20 which can be used for the purpose of pouring cat litter. When the screen 28 is at rest inside either interior bottom of the litter box half 12 or 14 the screen matches the contour of the embossed area of the litter box interior (as shown in FIG. 4A), creating a close fit. A triangular shaped molded plastic screen 28, shown in FIG. 4, comprises of at least two handles 30, 32 which are attached to the screen rim 34 and a screen 36 is wedge shaped 38 (see FIG. 4), for the purpose of confining pet excrement to the screen surface 36. In a similarly manner, the screen rim 38 can by virtue of its wedge shape dislodge any pet excrement stuck to the litter box sidewalls during the procedure of lifting the screen through the clumping cat litter thereby forcing it to collect on the screen surface 36.

Figure 5:
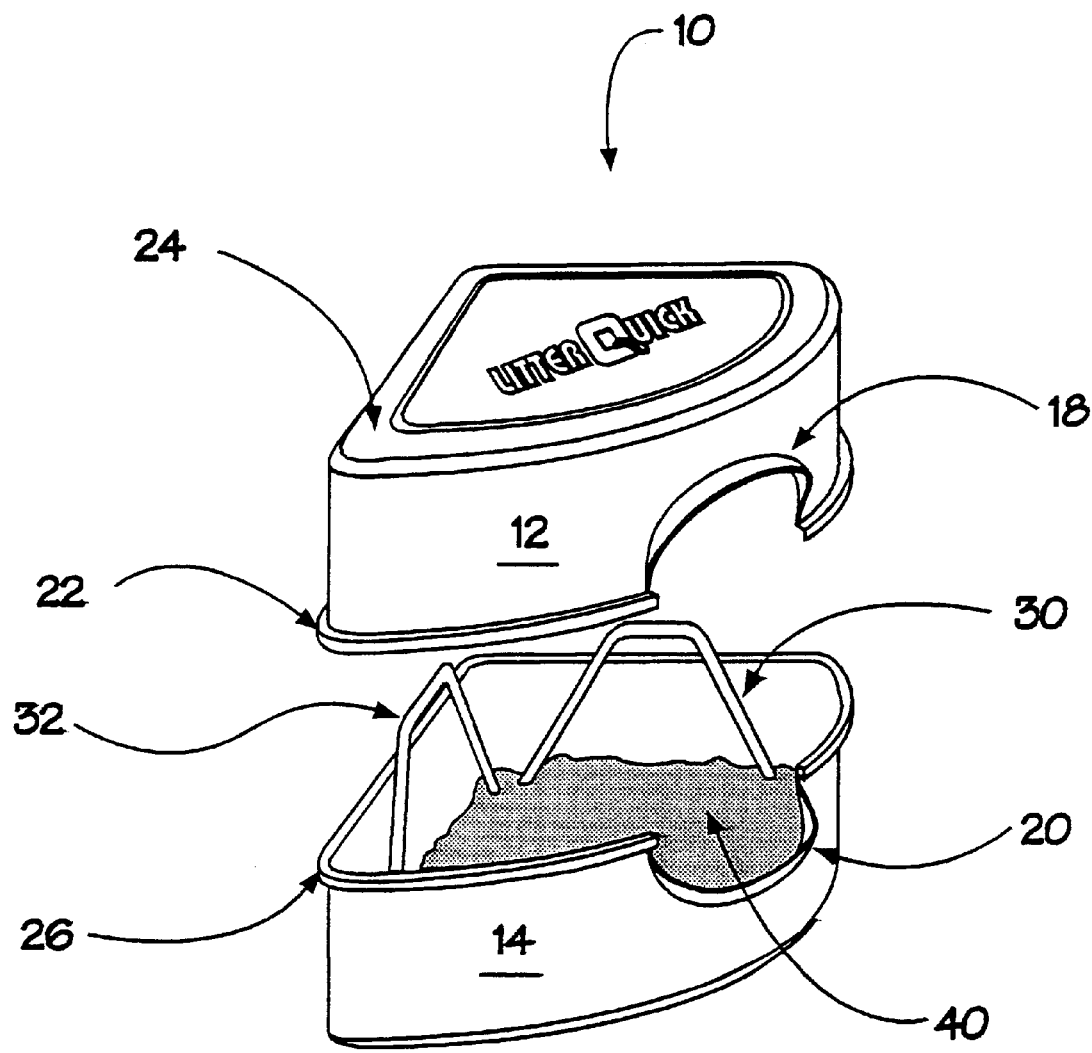
FIG. 5 is an exploded view of the litter box with litter therein.

The operation procedure for the litter box 10 begins with the placing of one of the litter box halves 12 or 14 on the floor surface having the box interior facing up (see FIG. 5, item 14). Next, lift the screen 28 using the handles 30, 32 and place the screen inside the litter box half 12 or 14. The screen 28 rests on the bottom interior of the litter box half 12 or 14 (see FIG. 4A). The screen is then covered by pouring clumping cat litter over the entire screen surface to the preferred depth of two inches (see FIG. 5 item 40). Next the litter box half 12 or 14 left empty is then placed on the litter box half containing the screen and clumping cat litter, by matching the triangle shape and the litter box opening, securing the two halves by method of joining the rim flange 22 to the rim seat 26. The litter box 10 is now in the preferred state for use as a pet litter box.

The following operation is preferred when it becomes necessary to remove pet excrement from the litter box 10:

Remove the litter box half 12 or 14 which is in the cover position and temporarily set it aside. Next using the screen 28 handles 30, 32 lift and gently shake the screen while lifting separating clean clumping cat litter from the pet excrement. The screen 28 has openings designed to allow the small granules of clean litter to pass through while trapping clumped wet and solid pet excrement on the screen surface 36. After properly disposing the pet excrement. Place the now empty screen 28 into the empty litter box half 12 or 14, resting the screen on the interior litter box bottom 12 or 14. Next lift the litter box half with the now clean litter and position it over the litter box half 12 or 14 with the screen 28 resting in the interior and by tilting the litter box half 12 or 14 with the clean litter pour the litter into the opposite half 12 or 14, covering the entire screen surface 36 with clean clumping cat litter. The now empty litter box half 12 or 14 is placed on the litter box half 12 or 14 containing the litter and screen 28 by matching the triangular shapes and joining the rim flange 22 to the rim seat 26, thereby completing the process.

The litter box 10 advantages over competition:

1. The litter box 10 saves time and does a better job of cleaning litter.
   The easy 1, 2, 3 method of using the litter box 10 is simpler and faster than using a typical scoop.
   By covering the entire interior diameter of the litter box 10, the litter box 10 ensures total removal of pet excrement. Scooping can leave hidden treasures behind.
2. By creating an enclosure, the litter box 10 helps to contain odors.
   Some models of litter boxes are simply topless pans exposing the odors to the room it resides in.
   Cats have a tendency to spill litter over the edges of non-enclosed litter boxes causing a messy environment.
3. The litter boxes' 10 overall triangular shape (unique to the market) fits nicely in an out of the way corner of the room.
   The triangular "corner" concept also plays well with cats' habit of relieving themselves in corners.
4. The screen's 18 handles are positioned to carry and distribute the weight of pet excrement which typically will be mostly in the back V shape of the litter box. Most weight will be toward the back, away from the entrance to the litter box.
5. The long handles on the screen 18 keep the pet owner at a safe distance from the pet excrement while cleaning the litter box 10.
6. During the "lift and sift" process of the screen pet excrement that happens to be stuck to the side walls of the litter box 10 is dislodged and forced to roll onto the screen surface by virtue of the wedge shape of the screen rim 38.
7. Each litter box half is molded to match the bottom surface of the screen 18 to create a close fit, preventing litter from gathering under the screen.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A litter box comprising:
   a first litter box half with a first recess, said first litter box half triangularly shaped;
   a second litter box half with a second recess, said second litter box half engages with said first litter box half to form an enclosure, said first recess aligning with said second recess when the first litter box half and second litter box half are engaged to form an entrance to the enclosure through which an animal can enter the enclosure, said second litter box half triangularly shaped, and with said first litter box half to fit into corners; and a screen which fits into either the first litter box half or the second litter box half, said screen having handles so the screen can be lifted from either the first litter box half or the second litter box half.

2. The litter box as described in claim 1 wherein the first and second recesses are each in the shape of a pour spout.

3. The litter box as described in claim 2 wherein the first litter box half has a rim flange and the second litter box half has a rim rest which engages with the rim flange to maintain the first litter box half and second litter box half together when they are engaged.

4. The litter box as described in claim 3 wherein each litter box half has a contour of its interior and the screen circumference matches the contour when it is in the respective litter box half.

5. The litter box as described in claim 4 wherein the screen has a rim along its circumference, said rim wedge shaped to scrape along the walls of the respective litter box half when the screen is lifted.

6. A method for dealing with cat litter comprising the steps of:
   placing a screen into a first litter box half;
   placing cat litter onto the screen;
   engaging the first litter box half with a second litter box half so the first and second litter box halves form an enclosure;
   having an animal enter the enclosure through an entrance defined by a first recess in the first litter box half and a second recess in the second litter box half which align and form the entrance when the first and second litter box halves are engaged; removing the second litter box half from the first litter box half after the animal has left the enclosure;
   lifting the screen out of the first litter box half so it scrapes the interior walls of the first litter box half with a rim of the screen as the screen is lifted;
   shifting the cat litter through the screen into the first litter box half;
   cleaning the screen;
   placing the screen into the second litter box half;
   pouring, the cat litter onto the screen in the second litter box; and
   engaging the first litter box half with the second litter box half.

* * * * *